US010912298B2

(12) United States Patent
Beestman et al.

(10) Patent No.: US 10,912,298 B2
(45) Date of Patent: Feb. 9, 2021

(54) LIQUID SULFONYLUREA HERBICIDE FORMULATIONS

(71) Applicant: E I DU PONT DE NEMOURS AND COMPANY, Wilmington, DE (US)

(72) Inventors: George B. Beestman, Madison, WI (US); James J. Reap, Wilmington, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 244 days.

(21) Appl. No.: 14/019,790

(22) Filed: Sep. 6, 2013

(65) Prior Publication Data

US 2014/0005051 A1 Jan. 2, 2014

Related U.S. Application Data

(63) Continuation of application No. 11/990,090, filed as application No. PCT/US2006/033986 on Aug. 31, 2006, now abandoned.

(60) Provisional application No. 60/713,518, filed on Sep. 1, 2005.

(51) Int. Cl.
*A01N 47/36* (2006.01)
*A01N 43/70* (2006.01)
*A01N 25/30* (2006.01)

(52) U.S. Cl.
CPC ............. *A01N 47/36* (2013.01); *A01N 25/30* (2013.01); *A01N 43/70* (2013.01)

(58) Field of Classification Search
CPC ......... A01N 47/36; A01N 43/70; A01N 25/30
USPC .......................................................... 504/134
See application file for complete search history.

(56) References Cited

U.S. PATENT DOCUMENTS

| | | | | |
|---|---|---|---|---|
| 4,394,506 A | 7/1983 | Levitt | |
| 4,441,919 A | 4/1984 | Albrecht et al. | |
| 4,936,900 A | 6/1990 | Hyson | |
| 5,163,996 A * | 11/1992 | Meyer | 504/178 |
| 5,376,621 A | 12/1994 | Frisch et al. | |
| 6,479,432 B1 * | 11/2002 | Sixl | 504/103 |
| 2002/0045549 A1 | 4/2002 | Kruger et al. | |
| 2003/0050193 A1 * | 3/2003 | Bieringer et al. | 504/136 |
| 2003/0060367 A1 | 3/2003 | Bieringer et al. | |
| 2003/0186816 A1 | 10/2003 | Hacker et al. | |
| 2004/0097378 A1 | 5/2004 | Maier et al. | |
| 2005/0026787 A1 | 2/2005 | Deckwer et al. | |
| 2005/0032647 A1 | 2/2005 | Deckwer et al. | |
| 2005/0113254 A1 | 5/2005 | Ziemer et al. | |
| 2005/0233906 A1 | 10/2005 | Schnabel et al. | |
| 2009/0029862 A1 | 1/2009 | Yoshii et al. | |

FOREIGN PATENT DOCUMENTS

| | | | |
|---|---|---|---|
| AU | 2003303027 B2 * | 7/2010 | A01N 47/36 |
| CA | 2018580 | 12/1990 | |
| CN | 1537428 A * | 10/2004 | A01N 47/36 |
| EP | 0017879 B1 | 10/1980 | |
| EP | 0232067 B1 | 8/1987 | |
| EP | 0402769 A1 | 12/1990 | |
| EP | 415569 A2 | 3/1991 | |
| EP | 0313317 B1 | 4/1992 | |
| EP | 0554015 A1 | 4/1993 | |
| EP | 554015 A1 * | 8/1993 | |
| EP | 237292 B1 | 2/1994 | |
| EP | 0592880 B1 | 4/1994 | |
| EP | 0598515 A1 * | 5/1994 | |
| EP | 415569 B1 | 7/1998 | |
| JP | 09183704 | 7/1997 | |
| JP | 200095620 A | 4/2000 | |
| JP | 2002528471 A | 9/2002 | |
| JP | 2004518749 A | 6/2004 | |
| KR | 20070118080 A | 12/2007 | |
| RU | 2258366 C1 | 8/2005 | |
| WO | 200120986 A1 | 3/2001 | |
| WO | WO-0187064 A1 * | 11/2001 | A01N 25/02 |
| WO | 2003073854 A1 | 9/2003 | |
| WO | 2006098156 A2 | 9/2006 | |

OTHER PUBLICATIONS

Abstract re JP 09183704A (Kumiai Chem. Ind. Co. Ltd.) Jul. 15, 1997.
Anonymous, 502007 Herbicidal Formulation, Research Disclosure, 2006 (Feb. 2006), vol. 502:109-112.
Abstract re EP 0017879.
Abstract re EP 0402769.
Abstract re EP 0592880.
Abstract re KR 20070118080A.
Abstract re RU 2258366C1.
S. Y. Lin et al., “Lignans”, Kirk-Othmer Encyclopedia of Chemical Technology Fourth Edition, 1995, pp. 268-289, vol. 15, Wiley-Interscience, New York, NY.
Anonymous, “Biodiesel”, Material Safety Data Sheet, 2005, Australian Renewable Fuels, Ltd., South Perth, Australia.
J. Van Gerpen et al., “Determining the Influence of Contaminants on Biodiesel Properties”, SAE Technical Paper Series, 1997, Technical Paper 971685, SAE, Warrendale, PA.
Browning, W. C., “Lignosulfonate Stabilized Emulsions in Oil Well Drilling Fluids”, The Journal of Petroleum Technology, Jun. 1955, pp. 9-15.
Ramsdale, B. K. et al., “Adjuvant and Herbicide Concentration in Spray Droplets Influence Phytotoxicity”, Weed Technology, 2002, 16(3):631-637.
Nalewaja, J. D. et al., “Surfactants and Oil Adjuvants with Nicosulfuron”, Weed Technology, Oct.-Dec. 1995, vol. 9 (4):689-695.

(Continued)

*Primary Examiner* — Abigail Vanhorn
*Assistant Examiner* — Mei Ping Chui

(57) ABSTRACT

Disclosed are single liquid-phase herbicide compositions comprising by weight, from 0.1 to 20% of one or more sulfonylurea herbicides, from 0 to 40% of one or more biologically active agents other than sulfonylurea herbicides, from 0.1 to 20% of one or more lignosulfonates, from 0 to 99.8% of one or more fatty acid esters of $C_1$-$C_4$ alkanols, and from 0 to 50% of one or more additional formulating ingredients.

12 Claims, No Drawings

(56) References Cited

OTHER PUBLICATIONS

Hutchinson, P. J. S., et al., "Broadleaf Weed Control and Potato Crop Safety with Postemergence Rimsulfuron, Metribuzin and Adjuvant Combinations", Weed Technology, 2004, 18(3):750-756.
Tonks, D. J. et al., "Postemergence Weed Control with Rimsulfuron and Various Adjuvants in Potato (*Solanum tuberosum*)", Weed Technology, 2001, 15(4):613-616.
Kirk-Othmer Encyclopedia of Chemical Technology, Fourth Ed., vol. 15, 1995, pp. 268-289.
Borregaard's Handbook of Lignosulphonates in Agrochemicals, Section 2 pp. 4-8, Section 3 pp. 9-17, Section 4, pp. 18-43; Section 5.
International Search Report and Written Opinion of corresponding PCT/US2006/033986 dated Aug. 8, 2007.
European Patent Office: Notice of Opposition to European Patent, EP 1 947 935, Electonically Available at the European Patent Register on Oct. 6, 2012.
European Patent Office: Patentee's Submission: Response to the Opposition of European Patent, EP 1 947 935, Jul. 31, 2013; Electronically Available at the European Patent Register on Aug. 1, 2013.
European Patent Office; Summons to Attend Oral Proceedings Pursuant to Rule 115(1) EPC, EP 1 947 935, Electronically Available at the European Patent Register on Mar. 17, 2014.
European Patent Office: Final Written Submission of Opponent, EP 1 947 935, Electronically Available at the European Patent Register on Jul. 21, 2014.
European Patent Office: Decision Rejecting the Opposition, EP 1 947 935, Electronically Availbale at the European Patent Register on Oct. 24, 2014.
European Patent Office: Minutes of the Oral Proceedings Before the Opposition Division, EP 1 947 935, Electronically Availbale at the European Patent Register on Oct. 24, 2014.
European Patent Office: Appeal Against the Decision of the Opposition Division; Grounds of Appeal of the Appelant, EP 1 947 935, Electronically Availbale at the European Patent Register on Mar. 2, 2015.

* cited by examiner

LIQUID SULFONYLUREA HERBICIDE FORMULATIONS

FIELD OF THE INVENTION

This invention relates to certain liquid formulations of sulfonylurea herbicides.

BACKGROUND OF THE INVENTION

Since the discovery of sulfonylurea herbicides, more than two dozen sulfonylureas have been commercially developed for selective weed control in a wide variety of crops (*The Pesticide Manual, Thirteenth Edition*, C. D. S. Tomlin, ed., British Crop Protection Council, Hampshire, U.K., 2003). As the mode of action of sulfonylurea herbicides is inhibition of the enzyme acetolactate synthase (ALS) found in plants but not animals, sulfonylurea herbicides provide a valued combination of excellent efficacy against weeds with low use rates and very low toxicity to animals.

Sulfonylurea herbicides like other agricultural chemicals can be formulated as concentrates in a variety of different forms, including liquid compositions such as emulsifiable concentrates and solid compositions such as wettable powders and granules.

Liquid formulation concentrates can be easily measured and poured, and when diluted with water typically give easily sprayed aqueous solutions or dispersions. When dissolved and dispersed in water, sulfonylureas are subject to hydrolysis. Furthermore hydrolysis and/or crystal growth can occur during storage of concentrated liquid formulations in which sulfonylureas are dissolved or dispersed, so that obtaining stable liquid formulations of sulfonylurea herbicides is problematical. New stabilized liquid formulations of sulfonylurea herbicides have now been discovered.

SUMMARY OF THE INVENTION

This invention is directed to a single liquid-phase herbicide composition comprising by weight (a) from 0.1 to 20% of one or more sulfonylurea herbicides;

(b) from 0 to 40% of one or more biologically active agents other than sulfonylurea herbicides;

(c) from 0.1 to 20% of one or more lignosulfonates;

(d) from 40 to 99.8% of one or more fatty acid esters of $C_1$-$C_4$ alkanols; and (e) from 0 to 50% of one or more additional formulating ingredients.

DETAILS OF THE INVENTION

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The term "single liquid-phase composition" and derivative terms such as "single liquid-phase herbicide composition" refer to compositions consisting of a single liquid phase. The term "single liquid-phase composition" therefore excludes compositions comprising a plurality of liquid phases such as emulsions. The term "single liquid-phase composition" does not exclude compositions comprising one or more solid phases in addition to the single liquid phase, such as suspensions and dispersions of solid particles.

The term "nonsulfonylurea herbicide" refers to herbicides other than sulfonylureas. As used in the present disclosure and claims, the term "fatty acid" refers to a monocarboxylic acid having a hydrocarbon chain containing 3 to 21 carbon atoms. The hydrocarbon chain may be branched and may be unsaturated (e.g., contain one or more carbon-carbon double bonds).

Embodiments of the present invention include:

Embodiment 1

The composition described the Summary of the Invention wherein component (a) (i.e., the one or more sulfonylurea herbicides) is from 0.5 to 10% of the composition by weight.

Embodiment 2

The composition described in the Summary of the Invention wherein component (a) is selected from amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flucetosulfuron, flupyrsulfuron-methyl, flazasulfuron, foramsulfuron, halosulfuron-methyl, imazosulfuron, iodosulfuron-methyl, mesosulfuron-methyl, metsulfuron-methyl, nicosulfuron, oxasulfuron, primisulfuron-methyl, prosulfuron, pyrazosulfuron-ethyl, rimsulfuron, sulfometuron-methyl, sulfosulfuron, thifensulfuron-methyl, triasulfuron, tribenuron-methyl, trifloxysulfuron, triflusulfuron-methyl and tritosulfuron, and salts thereof.

Embodiment 3

The composition of Embodiment 2 wherein component (a) is selected from azimsulfuron, bensulfuron-methyl, chlorimuron-ethyl, chlorsulfuron, ethametsulfuron-methyl, flupyrsulfuron-methyl, metsulfuron-methyl, nicosulfuron, rimsulfuron, sulfometuron-methyl, thifensulfuron-methyl, tribenuron-methyl, and triflusulfuron-methyl, and salts thereof.

Embodiment 4

The composition of Embodiment 3 wherein component (a) is selected from flupyrsulfuron-methyl, nicosulfuron and rimsulfuron, and salts thereof.

Embodiment 5

The composition of Embodiment 3 wherein component (a) is selected from metsulfuron-methyl, nicosulfuron, rimsulfuron and thifensulfuron-methyl, and salts thereof.

Embodiment 6

The composition of Embodiment 5 wherein component (a) is selected from nicosulfuron and rimsulfuron, and salts thereof.

Embodiment 7

The composition of Embodiment 6 wherein component (a) is selected from nicosulfuron and salts thereof.

Embodiment 8

The composition of Embodiment 3 wherein component (a) is selected from free acid forms of metsulfuron-methyl, nicosulfuron, rimsulfuron and thifensulfuron-methyl.

Embodiment 9

The composition of Embodiment 8 wherein component (a) is selected from free acid forms of nicosulfuron and rimsulfuron.

Embodiment 10

The composition of Embodiment 9 wherein component (a) is the free acid form of nicosulfuron.

Embodiment 11

The composition of any one of Embodiments 8, 9 and 10 wherein the free acid form of nicosulfuron is a hydrate.

Embodiment 12

The composition of Embodiment 9 wherein component (a) is the free acid form of rimsulfuron.

Embodiment 13

The composition described in the Summary of the Invention wherein component (b) (i.e., the one or more biologically active agents other than sulfonylurea herbicides) comprises one or more nonsulfonylurea herbicides and/or herbicide safeners.

Embodiment 14

The composition of Embodiment 13 wherein component (b) comprises atrazine.

Embodiment 15

The composition described in the Summary of the Invention wherein component (c) (i.e., the one or more lignosulfonates) is from 0.1 to 10% of the composition by weight.

Embodiment 16

The composition described in the Summary of the Invention wherein component (c) is from 3 to 8% of the composition by weight.

Embodiment 17

The composition described in the Summary of the Invention wherein component (c) is from 0.5 to 5% of the composition by weight.

Embodiment 18

The composition described in the Summary of the Invention wherein component (c) is at least about 0.5% of the composition by weight.

Embodiment 19

The composition described in the Summary of the Invention wherein component (c) is at least about 1% of the composition by weight.

Embodiment 20

The composition described in the Summary of the Invention wherein component (c) is at least about 2% of the composition by weight.

Embodiment 21

The composition described in the Summary of the Invention wherein component (c) is at least about 3% of the composition by weight.

Embodiment 22

The composition described in the Summary of the Invention wherein component (c) is no more than about 8% of the composition by weight.

Embodiment 23

The composition described in the Summary of the Invention wherein component (c) is no more than about 6% of the composition by weight.

Embodiment 24

The composition described in the Summary of the Invention wherein component (c) is no more than about 5% of the composition by weight.

Embodiment 25

The composition described in the Summary of the Invention wherein component (c) comprises one or more ammonium, alkali metal or alkaline earth metal lignosulfonate salts.

Embodiment 26

The composition of Embodiment 25 wherein component (c) comprises sodium lignosulfonate.

Embodiment 27

The composition described in the Summary of the Invention wherein component (d) (i.e., the one or more fatty acid esters of $C_1$-$C_4$ alkanols) comprises methyl esters of one or more fatty acids.

Embodiment 28

The composition described in the Summary of the Invention wherein at least about 80% by weight of component (d) comprises esters of fatty acids containing 8 to 22 carbon atoms.

Embodiment 29

The composition described in the Summary of the Invention wherein at least about 90% by weight of component (d) comprises esters of fatty acids containing 8 to 22 carbon atoms.

Embodiment 30

The composition described in the Summary of the Invention wherein component (d) comprises a saturated or an unsaturated $C_{10}$-$C_{22}$ fatty acid ester of a $C_1$-$C_4$ alkanol.

Embodiment 31

The composition described in the Summary of the Invention wherein component (d) comprises a saturated or an unsaturated $C_{12}$-$C_{20}$ fatty acid ester of a $C_1$-$C_4$ alkanol.

Embodiment 32

The composition described in the Summary of the Invention wherein component (d) comprises a saturated or an unsaturated $C_{16}$-$C_{18}$ fatty acid ester of a $C_1$-$C_4$ alkanol.

Embodiment 33

The composition described in the Summary of the Invention wherein component (d) comprises a saturated or an unsaturated $C_{16}$-$C_{18}$ fatty acid ester of a $C_1$-$C_2$ alkanol.

Embodiment 34

The composition described in the Summary of the Invention wherein component (d) comprises a saturated or an unsaturated $C_{16}$-$C_{18}$ fatty acid ester of methanol.

Embodiment 35

The composition described in the Summary of the Invention wherein component (d) comprises a methylated seed oil of sunflower, soybean, cotton or linseed.

Embodiment 36

The composition described in the Summary of the Invention wherein component (d) comprises methylated soybean oil (methyl soyate).

Embodiment 37

The composition described in the Summary of the Invention wherein component (e) (i.e., the one or more additional formulation ingredients) is selected from surfactants, suspending agents and diluents.

Embodiment 38

The composition described in the Summary of the Invention wherein component (e) comprises a polyethoxylated sorbitan ester surfactant.

Embodiment 39

The composition described in the Summary of the Invention wherein component (e) is selected from the group consisting of a polyoxyethylated sorbitan ester surfactant and a polyethoxylated sorbitol ester surfactant.

Embodiment 40

The composition described in the Summary of the Invention wherein component (e) comprises both a polyethoxylated sorbitan ester surfactant and a polyethoxylated sorbitol ester surfactant.

Embodiment 41

The composition described in the Summary of the Invention wherein component (e) does not exceed about 40% by weight of the composition.

Embodiment 42

The composition described in the Summary of the Invention wherein component (e) does not exceed about 15% by weight of the composition.

Embodiment 43

The composition described in the Summary of the Invention containing no more than about 1% water by weight.

Embodiment 44

The composition of Embodiment 43 containing no more than about 0.5% water by weight.

Embodiment 45

The composition of Embodiment 44 containing no more than about 0.1% water by weight.

Embodiment 46

The composition described in the Summary of the Invention wherein component (e) comprises a clay.

Embodiment 47

The composition of Embodiment 46 wherein the clay is at least about 0.1% of the composition by weight.

Embodiment 48

The composition of Embodiment 47 wherein the clay is at least about 0.5% of the composition by weight.

Embodiment 49

The composition of Embodiment 46 wherein the clay is no more than about 5% of the composition by weight.

Embodiment 50

The composition of Embodiment 46 wherein the clay is no more than about 3% of the composition by weight.

Embodiments of this invention can be combined in any manner.

Of note is a composition of Embodiment 2 wherein the sulfonylurea is other than flucetosulfuron. Of note is the composition as described in the Summary of the Invention or any one of Embodiments 1-41 and 43-50 comprising 0 to 20% of one or more formulating ingredients (e).

Also of note is a single liquid-phase herbicide composition consisting essentially of by weight (a) from 0.1 to 20% of one or more sulfonylurea herbicides;
(b) from 0.1 to 20% of one or more lignosulfonates; and
(c) from 40 to 99.8% of one or more fatty acid esters of $C_1$-$C_4$ alkanols; and optionally
(d) from 0 to 40% of one or more biologically active agents other than sulfonylurea herbicides; and
(e) from 0 to 50% of one or more additional formulating ingredients.

Of note are the single liquid-phase herbicide compositions of this invention (including but not limited to Embodiments 1-14, 18-41 and 43-50) wherein component (c) is from 0.1 to 10% of the composition by weight, and component (e) is from 0 to 20% of the composition by weight.

This invention provides a single liquid-phase composition comprising one or more sulfonylurea herbicides amounting to about 0.1 to about 20%, more typically about 0.5 to about 10%, by weight of the composition. Sulfonylurea herbicides are well known in the art. Sulfonylurea herbicide molecules comprise a sulfonylurea moiety (—$S(O)_2NHC(O)NH(R)$—). In sulfonylurea herbicides the sulfonyl end of the sulfonylurea moiety is connected either directly or by way of an oxygen atom or an optionally substituted amino or methylene group to a typically substituted cyclic or acyclic group. At the opposite end of the sulfonylurea bridge, the amino group, which may have a substituent such as methyl (R being $CH_3$) instead of hydrogen, is connected to a heterocyclic group, typically a symmetric pyrimidine or triazine ring, having one or two substituents such as methyl, ethyl, trifluoromethyl, methoxy, ethoxy, methylamino, dimethylamino, ethylamino and the halogens. Sulfonylurea herbicides can be in the form of the free acid or a salt. In the free acid form the sulfonamide nitrogen on the bridge is not deprotonated (i.e. —$S(O)_2NHC(O)NH(R)$—), while in the salt form the sulfonamide nitrogen atom on the bridge is deprotonated (i.e. —$S(O)_2N^{\ominus}C(O)NH(R)$—), and a cation is present, typically of an alkali metal or alkaline earth metal, most commonly sodium or potassium. Furthermore certain crystal forms of sulfonylureas can accommodate inclusion of water molecules (i.e. to form a hydrate) or other small molecules such as lower ($C_1$-$C_4$) alkanols and ethers such as 1,4-dioxane. Small molecules have molecular weights typically less than 200, more typically less than 150. Such sulfonylurea crystal forms containing water or other molecules are useful in the present invention, and the sulfonylureas in the presently claimed compositions include said crystal forms. Of particular note for the present single liquid-phase herbicide composition is the hydrated crystal form of nicosulfuron.

Representative of the sulfonylureas useful in the present invention are those of Formula I and salts thereof.

I

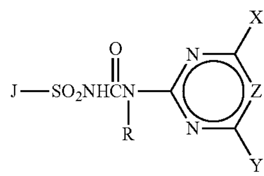

wherein:

J is selected from the group consisting of

J-1

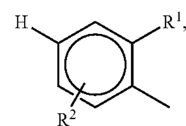

J-2

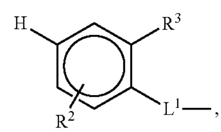

J-3

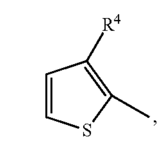

J-4

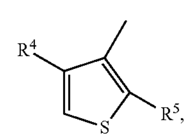

J-5

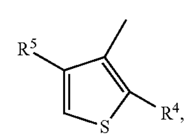

J-6

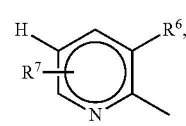

J-7

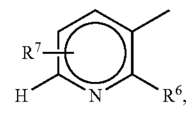

J-8

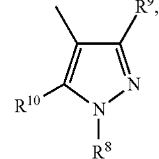

J-9

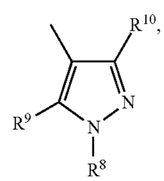

J-10

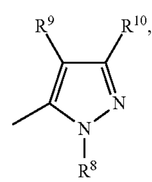

-continued

J-11

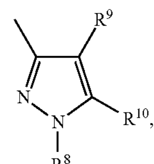

J-12

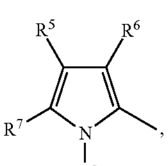

J-13

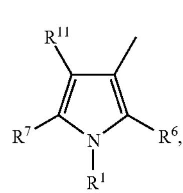

J-14

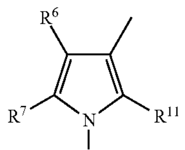

and

J-15

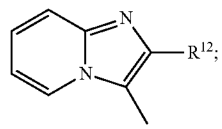

or

J is $R^{13}SO_2N(CH_3)$—;

R is H or $CH_3$;

$R^1$ is F, Cl, Br, $NO_2$, $C_1$-$C_4$ alkyl, $C_1$-$C_4$ haloalkyl, $C_3$-$C_4$ cycloalkyl, $C_2$-$C_4$ haloalkenyl, $C_1$-$C_4$ alkoxy, $C_1$-$C_4$ haloalkoxy, $C_2$-$C_4$ alkoxyalkoxy, $CO_2R^{14}$, $C(O)NR^{15}R^{16}$; $SO_2NR^{17}R^{18}$; $S(O)_nR^{19}$; $C(O)R^{20}$, $CH_2CN$ or L;

$R^2$ is H, F, Cl, Br, I, CN, $CH_3$, $OCH_3$, $SCH_3$, $CF_3$ or $OCF_2H$;

$R^3$ is $C_1$, $NO_2$, $CO_2CH_3$, $CO_2CH_2CH_3$, $C(O)CH_3$, $C(O)CH_2CH_3$, C(O)-cyclopropyl, $SO_2N(CH_3)_2$, $SO_2CH_3$, $SO_2CH_2CH_3$, $OCH_3$ or $OCH_2CH_3$;

$R^4$ is $C_1$-$C_3$ alkyl, $C_1$-$C_2$ haloalkyl, $C_1$-$C_2$ alkoxy, $C_2$-$C_4$ haloalkenyl, F, Cl, Br, $NO_2$, $CO_2R^{14}$, $C(O)NR^{15}R^{16}$; $SO_2NR^{17}R^{18}$; $S(O)_nR^{19}$; $C(O)R^{20}$ or L, $R^5$ is H, F, Cl, Br or $CH_3$;

$R^6$ is $C_1$-$C_3$ alkyl optionally substituted with 0-3 F, 0-1 Cl and 0-1 $C_3$-$C_4$ alkoxyacetyloxy, or $R^6$ is $C_1$-$C_2$ alkoxy, $C_2$-$C_4$ haloalkenyl, F, Cl, Br, $CO_2R^{14}$, $C(O)NR^{15}R^{16}$; $SO_2NR^{17}R^{18}$; $S(O)_nR^{19}$; $C(O)R^{20}$ or L;

$R^7$ is H, F, Cl, $CH_3$ or $CF_3$;

$R^8$ is H, $C_1$-$C_3$ alkyl or pyridyl;

$R^9$ is $C_1$-$C_3$ alkyl, $C_1$-$C_2$ alkoxy, F, Cl, Br, $NO_2$, $CO_2R^{14}$, $SO_2NR^{17}R^{18}$; $S(O)_nR^{19}$, $OCF_2H$, $C(O)R^{20}$, $C_2$-$C_4$ haloalkenyl or L;

$R^{10}$ is H, Cl, F, Br, $C_1$-$C_3$ alkyl or $C_1$-$C_2$ alkoxy;

$R^{11}$ is H, $C_1$-$C_3$ alkyl, $C_1$-$C_2$ alkoxy, $C_2$-$C_4$ haloalkenyl, F, Cl, Br, $CO_2R^{14}$, $C(O)NR^{15}R^{16}$; $SO_2NR^{17}R^{18}$; $S(O)_nR^{19}$; $C(O)R^{20}$ or L;

$R^{12}$ is halogen, $C_1$-$C_4$ alkyl or $C_1$-$C_3$ alkylsulfonyl;

$R^{13}$ is $C_1$-$C_4$ alkyl;

$R^{14}$ is selected from the group consisting of allyl, propargyl, oxetan-3-yl and $C_1$-$C_3$ alkyl optionally substituted by at least one member independently selected from halogen, $C_1$-$C_2$ alkoxy and CN;

$R^{15}$ is H, $C_1$-$C_3$ alkyl or $C_1$-$C_2$ alkoxy;

$R^{16}$ is $C_1$-$C_2$ alkyl;

$R^{17}$ is H, $C_1$-$C_3$ alkyl, $C_1$-$C_2$ alkoxy, allyl or cyclopropyl;

$R^{18}$ is H or $C_1$-$C_3$ alkyl;

$R^{19}$ is $C_1$-$C_3$ alkyl, $C_1$-$C_3$ haloalkyl, allyl or propargyl;

$R^{20}$ is $C_1$-$C_4$ alkyl, $C_1$-$C_4$ haloalkyl or $C_3$-$C_5$ cycloalkyl optionally substituted by halogen;

n is 0, 1 or 2;

L is $L^1$ is $CH_2$, NH or O;

$R^{21}$ is selected from the group H and $C_1$-$C_3$ alkyl;

X is selected from the group H, $C_1$-$C_4$ alkyl, $C_1$-$C_4$ alkoxy, $C_1$-$C_4$ haloalkoxy, $C_1$-$C_4$ haloalkyl, $C_1$-$C_4$ haloalkylthio, $C_1$-$C_4$ alkylthio, halogen, $C_2$-$C_5$ alkoxyalkyl, $C_2$-$C_5$ alkoxyalkoxy, amino, $C_1$-$C_3$ alkylamino and di($C_1$-$C_3$ alkyl)amino;

Y is selected from the group H, $C_1$-$C_4$ alkyl, $C_1$-$C_4$ alkoxy, $C_1$-$C_4$ haloalkoxy, $C_1$-$C_4$ alkylthio, $C_1$-$C_4$ haloalkylthio, $C_2$-$C_5$ alkoxyalkyl, $C_2$-$C_5$ alkoxyalkoxy, amino, $C_1$-$C_3$ alkylamino, di($C_1$-$C_3$ alkyl)amino, $C_3$-$C_4$ alkenyloxy, $C_3$-$C_4$ alkynyloxy, $C_2$-$C_5$ alkylthioalkyl, $C_2$-$C_5$ alkylsulfinylalkyl, $C_2$-$C_5$ alkylsulfonylalkyl, $C_1$-$C_4$ haloalkyl, $C_2$-$C_4$ alkynyl, $C_3$-$C_5$ cycloalkyl, azido and cyano; and Z is selected from the group CH and N;

provided that (i) when one or both of X and Y is $C_1$ haloalkoxy, then Z is CH; and (ii) when X is halogen, then Z is CH and Y is $OCH_3$, $OCH_2CH_3$, $NHCH_3$, $N(CH_3)_2$ or $OCF_2H$. Of note is the present single liquid herbicide composition comprising one or more sulfonylureas of Formula I wherein when $R^6$ is alkyl, said alkyl is unsubstituted.

In the above recitations, the term "alkyl", used either alone or in compound words such as "alkylthio" or "haloalkyl" includes straight-chain or branched alkyl, such as, methyl, ethyl, n-propyl, i-propyl, or the different butyl isomers. "Cycloalkyl" includes, for example, cyclopropyl, cyclobutyl and cyclopentyl. "Alkenyl" includes straight-chain or branched alkenes such as ethenyl, 1-propenyl, 2-propenyl, and the different butenyl isomers. "Alkenyl" also includes polyenes such as 1,2-propadienyl and 2,4-butadienyl. "Alkynyl" includes straight-chain or branched alkynes such as ethynyl, 1-propynyl, 2-propynyl and the different butynyl isomers. "Alkynyl" can also include moieties comprised of multiple triple bonds such as 2,5-hexadiynyl. "Alkoxy" includes, for example, methoxy, ethoxy, n-propyloxy, isopropyloxy and the different butoxy isomers. "Alkoxyalkyl" denotes alkoxy substitution on alkyl. Examples of "alkoxyalkyl" include $CH_3OCH_2$, $CH_3OCH_2CH_2$, $CH_3CH_2OCH_2$, $CH_3CH_2CH_2CH_2OCH_2$ and $CH_3CH_2OCH_2CH_2$. "Alkoxyalkoxy" denotes alkoxy substitution on alkoxy. "Alkenyloxy" includes straight-chain or branched alkenyloxy moieties. Examples of "alkenyloxy" include $H_2C{=}CHCH_2O$, $(CH_3)CH{=}CHCH_2O$ and $CH_2{=}CHCH_2CH_2O$. "Alkynyloxy" includes straight-chain or branched alkynyloxy moieties. Examples of "alkynyloxy" include $HC{\equiv}CCH_2O$ and $CH_3C{\equiv}CCH_2O$. "Alkylthio" includes branched or straight-chain alkylthio moieties such as methylthio, ethylthio, and the different propylthio isomers. "Alkylthioalkyl" denotes alkylthio substitution on alkyl. Examples of "alkylthioalkyl" include $CH_3SCH_2$, $CH_3SCH_2CH_2$, $CH_3CH_2SCH_2$, $CH_3CH_2CH_2CH_2SCH_2$ and $CH_3CH_2SCH_2CH_2$; "alkylsulfinylalkyl" and "alkylsulfonylalkyl" include the corresponding sulfoxides and sulfones, respectively. Other substituents such as "alkylamino", "dialkylamino" are defined analogously.

The total number of carbon atoms in a substituent group is indicated by the "$C_i$-$C_j$" prefix where i and j are numbers from 1 to 5. For example, $C_1$-$C_4$ alkyl designates methyl through butyl, including the various isomers. As further examples, $C_2$ alkoxyalkyl designates $CH_3OCH_2$; $C_3$ alkoxyalkyl designates, for example, $CH_3CH(OCH_3)$, $CH_3OCH_2CH_2$ or $CH_3CH_2OCH_2$; and $C_4$ alkoxyalkyl designates the various isomers of an alkyl group substituted with an alkoxy group containing a total of four carbon atoms, examples including $CH_3CH_2CH_2OCH_2$ and $CH_3CH_2OCH_2CH_2$.

The term "halogen", either alone or in compound words such as "haloalkyl", includes fluorine, chlorine, bromine or iodine. Further, when used in compound words such as "haloalkyl", said alkyl may be partially or fully substituted with halogen atoms which may be the same or different. Examples of "haloalkyl" include $F_3C$, $ClCH_2$, $CF_3CH_2$ and $CF_3CCl_2$. The terms "haloalkoxy", "haloalkylthio", and the like, are defined analogously to the term "haloalkyl". Examples of "haloalkoxy" include $CF_3O$, $CCl_3CH_2O$, $HCF_2CH_2CH_2O$ and $CF_3CH_2O$. Examples of "haloalkylthio" include $CCl_3S$, $CF_3S$, $CCl_3CH_2S$ and $ClCH_2CH_2CH_2S$.

The following sulfonylurea herbicides illustrate sulfonylureas useful for this invention: amidosulfuron (N-[[[[(4,6-dimethoxy-2-pyrimdinyl)amino]carbonyl]amino]sulfonyl]-N-methylmethanesulfonamide), azimsulfuron (N-[[(4,6-dimethoxy-2-pyrimidinyl)amino]-carbonyl]-1-methyl-4-(2-methyl-2H-tetrazol-5-yl)-1H-pyrazole-5-sulfonamide), bensulfuron-methyl(methyl 2-[[[[[(4,6-dimethoxy-2-pyrimidinyl)amino]carbonyl]amino]-sulfonyl]methyl]benzoate), chlorimuron-ethyl(ethyl 2-[[[[(4-chloro-6-methoxy-2-pyrimidinyl)amino]carbonyl]amino]sulfonyl]benzoate), chlorsulfuron (2-chloro-N-[[(4-methoxy-6-methyl-1,3,5-triazin-2-yl)amino]carbonyl]benzenesulfonamide), cinosulfuron (N-[[(4,6-dimethoxy-1,3,5-triazin-2-yl)amino]carbonyl]-2-(2-methoxyethoxy)-benzenesulfonamide), cyclosulfamuron (N-[[[2-(cyclopropylcarbonyl)phenyl]amino]-sulfonyl]-N[1]-(4,6-dimethoxypyrimidin-2-yl)urea), ethametsulfuron-methyl(methyl 2-[[[[[4-ethoxy-6-(methylamino)-1,3,5-triazin-2-yl]amino]carbonyl]amino]-sulfonyl]benzoate), ethoxysulfuron (2-ethoxyphenyl[[(4,6-dimethoxy-2-pyrimidinyl)-amino]carbonyl]sulfamate), flupyrsulfuron-methyl(methyl 2-[[[[(4,6-dimethoxy-2-pyrimidinyl)amino]carbonyl]amino]sulfonyl]-6-(trifluoromethyl)-3-pyridinecarboxylate), flazasulfuron (N-[[(4,6-dimethoxy-2-pyrimidinyl)amino]carbonyl]-3-(trifluoromethyl)-2-pyridinesulfonamide), flucetosulfuron (1-[3-[[[[(4,6-dimethoxy-2-pyrimidinyl)-amino]carbonyl]amino]sulfonyl]-2-pyridinyl]-2-fluoropropyl methoxyacetate), foramsulfuron (2-[[[[(4,6-dimethoxy-2-pyrimidinyl)amino]carbonyl]amino]sulfonyl]-4-(formylamino)-N,N-dimethylbenzamide), halosulfuron-methyl(methyl 3-chloro-5-[[[[(4,6-dimethoxy-2-pyrimidinyl)amino]carbonyl]amino]sulfonyl]-1-methyl-1H-pyrazole-4-carboxylate), imazosulfuron (2-chloro-N-[[(4,6-dimethoxy-2-pyrimidinyl)amino]-carbonyl]imidazo[1,2-a]pyridine-3-sulfonamide), iodosulfuron-methyl(methyl 4-iodo-2-[[[[(4-methoxy-6-methyl-1,3,5-triazin-2-yl)amino]carbonyl]amino]sulfonyl]benzoate), mesosulfuron-methyl(methyl 2-[[[[(4,6-dimethoxy-2-pyrimidinyl)amino]carbonyl]amino]-sulfonyl]-4-[[(methylsulfonyl)amino]methyl]benzoate), metsulfuron-methyl(methyl 2-[[[[(4-methoxy-6-methyl-1,3,5-triazin-2-yl)amino]carbonyl]amino]sulfonyl]benzoate), nicosulfuron (2-[[[[(4,6-dimethoxy-2-pyrimidinyl)amino]carbonyl]amino]sulfonyl]-N,N-dimethyl-3-pyridinecarboxamide), oxasulfuron (3-oxetanyl 2-[[[[(4,6-dimethyl-2-pyrimidinyl)amino]carbonyl]amino]sulfonyl]benzoate), primisulfuron-methyl(methyl 2-[[[[[4,6-bis(trifluoromethoxy)-2-pyrimidinyl]amino]carbonyl]amino]sulfonyl]benzoate), prosulfuron (N-[[(4-methoxy-6-methyl-1,3,5-triazin-2-yl)amino]carbonyl]-2-(3,3,3-trifluoropropyl)benzenesulfonamide), pyrazosulfuron-ethyl (ethyl 5-[[[[(4,6-dimethoxy-2-pyrimidinyl)amino]carbonyl]amino]sulfonyl]-1-methyl-1H-pyrazole-4-carboxylate), rimsulfuron (N-[[(4,6-dimethoxy-2-pyrimidinyl)amino]carbonyl]-3-(ethylsulfonyl)-2-pyridinesulfonamide), sulfometuron-methyl(methyl 2-[[[[(4,6-dimethyl-2-pyrimidinyl)amino]carbonyl]amino]sulfonyl]-benzoate), sulfosulfuron (N-[[(4,6-dimethoxy-2-pyrimidinyl)amino]carbonyl]-2-(ethylsulfonyl)imidazo[1,2-a]pyridine-3-sulfonamide), thifensulfuron-methyl(methyl 3-[[[[(4-methoxy-6-methyl-1,3,5-triazin-2-yl)amino]carbonyl]amino]sulfonyl]-2-thiophenecarboxylate), triasulfuron (2-(2-chloroethoxy)-N-[[(4-methoxy-6-methyl-1,3,5-triazin-2-yl)amino]carbonyl]benzenesulfonamide), tribenuron-methyl(methyl 2-[[[[N-(4-methoxy-6-methyl-1,3,5-triazin-2-yl)-N-methylamino]carbonyl]amino]-sulfonyl]benzoate), trifloxysulfuron (N-[[(4,6-dimethoxy-2-pyrimidinyl)amino]carbonyl]-3-(2,2,2-trifluoroethoxy)-2-pyridinesulfonamide), triflusulfuron-methyl(methyl 2-[[[[[4-dimethylamino)-6-(2,2,2-trifluoroethoxy)-1,3,5-triazin-2-yl]amino]carbonyl]amino]-sulfonyl]-3-methylbenzoate) and tritosulfuron (N-[[[4-methoxy-6-(trifluoromethyl)-1,3,5-triazin-2-yl]amino]carbonyl]-2-(trifluoromethyl)benzenesulfonamide), and salts thereof.

A wide variety of methods to prepare sulfonylureas are known in the extensive sulfonylurea herbicide art. The above named sulfonylureas are active ingredients in commercially available herbicide products and are described in *The Pesticide Manual, Thirteenth Edition*, C. D. S. Tomlin, ed., BCPC, Hampshire, UK, 2003, which is hereby incorporated by reference. Salts of sulfonylureas can include acid-addition salts with inorganic or organic acids such as hydrobromic, hydrochloric, nitric, phosphoric, sulfuric, acetic, butyric, fumaric, lactic, maleic, malonic, oxalic, propionic, salicylic, tartaric, 4-toluenesulfonic or valeric acids. Of greater importance are salts of sulfonylureas formed with organic bases (e.g., pyridine, ammonia, or triethylamine) or inorganic bases (e.g., hydrides, hydroxides, or carbonates of sodium, potassium, lithium, calcium, magnesium or barium). Preferred salts of sulfonylureas include lithium, sodium, potassium, triethylammonium, and quaternary ammonium salts. Salts of sulfonylureas can be prepared by a number of ways known in the art, including contact of a sulfonylurea with an acid or base, or using ion exchange with a sulfonylurea salt.

As already mentioned, certain crystal forms of sulfonylureas can include water and other small molecules within the crystal lattice. These crystal forms are typically prepared by crystallization of the sulfonylurea from a liquid medium containing the water or other small molecule or by contact of a sulfonylurea crystalline solid with the water or other small molecule. Of particular note is a composition of the present invention comprising a hydrated crystal form of nicosulfuron, wherein the nicosulfuron is the free acid. This hydrated crystal form of nicosulfuron can be prepared by heating a slurry of nicosulfuron in a mixture of water and ethyl acetate as described in U.S. Pat. No. 5,202,439. The nicosulfuron used in the compositions of Examples 1 to 11 and Comparative Example 1 was in the hydrate crystal form prepared by this method.

The single liquid phase compositions of the present invention can comprise in addition to sulfonylurea herbicides up to about 40% by weight of one or more other biologically active agents. Other biologically active agents may include herbicides other than sulfonylureas and may also include plant growth regulants, herbicide safeners, insecticides, insect antifeedants, miticides, nematocides, bactericides and fungicides, including both chemical and biological agents. Most commonly, the other active biologically active agents are herbicides and/or herbicide safeners. The other herbicides include compounds that inhibit acetolactate synthase. Examples of herbicides include acetochlor, acifluorfen, aclonifen, alachlor, alloxydim, ametryn, amicarbazone, aminopyralid, amitrole, anilofos, asulam, atrazine, beflubutamid, benazolin, bencarbazone, benfluralin, benfuresate, bensulide, bentazone, benzobicyclon, benzofenap, bifenox, bilanafos, bispyribac, bromacil, bromobutide, bromoxynil, butachlor, butafenacil, butamifos, butralin, butroxydim, butylate, cafenstrole, carbetamide, carfentrazone-ethyl, chloramben, chlorbromuron, chlorflurenol-methyl, chloridazon, chlorotoluron, chlorpropham, chlorthal-dimethyl, chlorthiamid, cinidon-ethyl, cinmethylin, clethodim, clodinafop-propargyl, clomazone, clomeprop, clopyralid, cloransulam-methyl, cumyluron, cyanazine, cycloate, cycloxydim, cyhalofop-butyl, 2,4-D, daimuron, 2,4-DB, dazomet, desmedipham, dicamba, dichlobenil, dichlorprop, diclofop-methyl, diclosulam, difenzoquat metilsulfate, diflufenican, diflufenzopyr, dimefuron, dimepiperate, dimethachlor, dimethametryn, dimethenamid, dimethipin, dinitramine, dinoterb, diphenamid, diquat dibromide, dithiopyr, diuron, endothal, EPTC, esprocarb, ethalfluralin, ethofumesate, etobenzanid, fenoxaprop-P-ethyl, fentrazamide, fenuron, flamprop-M, florasulam, fluazifop-butyl, fluazifop-P-butyl, fluazolate, flucarbazone, fluchloralin, flufenacet, flufenpyr, flufenpyr-ethyl, flumetsulam, flumichlorac-pentyl, flumioxazin, fluometuron, fluoroglycofen-ethyl, fluridone, fluorochloridone, fluroxypyr, flurtamone, fluthiacet-methyl, fomesafen, glufosinate, glyphosate, haloxyfop, hexazinone, imazamethabenz-methyl, imazamox, imazapic, imazapyr, imazaquin, imazethapyr, indanofan, ioxynil, isoproturon, isouron, isoxaben, isoxaflutole, isoxachlortole, lactofen, lenacil, linuron, MCPA, MCPB, mecoprop, mecoprop-P, mefenacet, mefluidide, metamifop, mesotrione, metamitron, metazachlor, methabenzthiazuron, methyldymron, metobenzuron, metobromuron, metolachlor, S-metolachlor, metosulam, metoxuron, metribuzin, molinate, monolinuron, naproanilide, napropamide, naptalam, neburon, norflurazon, orbencarb, oryzalin, oxadiargyl, oxadiazon, oxaziclomefone, oxyfluorfen, paraquat dichloride, pebulate, pendimethalin, penoxsulam, pentanochlor, pentoxazone, phenmedipham, picloram, picolinafen, pinoxaden, piperophos, pretilachlor, prodiamine, profoxydim, prometon, prometryn, propachlor, propanil, propaquizafop, propazine, propham, propisochlor, propyzamide, prosulfocarb, pyraflufen-ethyl, pyrasulfotole, pyrazolynate, pyrazoxyfen, pyribenzoxim, pyributicarb, pyridate, pyriftalid, pyriminobac-methyl, pyrimisulfan, pyrithiobac, pyroxsulam, quinclorac, quinmerac, quizalofop, quizalofop-P, sethoxydim, siduron, simazine, simetryn, sulcotrione, sulfentrazone, 2,3,6-TBA, tebutam, tebuthiuron, tefuryltrione (AVH-301; 2-[2-chloro-4-(methylsulfonyl)-3-[[(tetrahydro-2-furanyl)methoxy]methyl]benzoyl]-1,3-cyclohexanedione), tembotrione, tepraloxydim, terbacil, terbumeton, terbuthylazine, terbutryn, thenylchlor, thiazopyr, thiencarbazone, thiobencarb, tiocarbazil, topramezone, tralkoxydim, tri-allate, triaziflam, triclopyr, trietazine, trifluralin and vernolate. Illustrative herbicide safeners include benoxacor, BCS (1-bromo-4-Rchloromethyl)sulfonylThenzene), cloquintocet-mexyl, cyometrinil, dichlormid, 2-(dichloromethyl)-2-methyl-1,3-dioxolane (MG 191), fenchlorazole-ethyl, fenclorim, flurazole, fluxofenim, furilazole, isoxadifen-ethyl, mefenpyr-ethyl, methoxyphenone ((4-methoxy-3-methylphenyl)(3-methylphenyl)methanone), naphthalic anhydride and oxabetrinil. Of note are compositions where the weight ratio of other biologically active agents to sulfonylurea herbicides is between about 1:100 and about 100:1.

The liquid carrier of the single liquid-phase composition of the present invention comprises one or more fatty acid esters of $C_1$-$C_4$ alkanols such that the one or more fatty acid esters of $C_1$-$C_4$ alkanols amount to about 40 to about 99.8% by weight of the composition. The liquid carrier can further comprise one or more additional formulating ingredients such as other substances used as liquid carriers. In mixtures with fatty acid esters of $C_1$-$C_4$ alkanols sulfonylureas as well as lignosulfonates remain mostly undissolved, and thus the single liquid-phase compositions of the present invention are generally in the form of suspension concentrates.

The $C_1$-$C_4$ alkanol-derived portions of the fatty acid esters can be unbranched (i.e. straight-chain) or branched, but are typically unbranched. For reasons including favorable physical properties, commercial availability and cost, preferably the fatty acid esters are fatty acids esterified with $C_1$-$C_2$ alkanols and more preferably $C_1$ alkanol (i.e. methanol). The fatty acid alkanol esters in a composition of the present invention can be derived from a mixture of alcohols (e.g., methanol and ethanol).

The fatty acid portions of the fatty acid esters consist of a carboxylate moiety bound to a hydrocarbon chain, which can be unbranched or branched, but is typically unbranched in natural sources. The hydrocarbon chain can be saturated or unsaturated; typically the hydrocarbon chain is saturated (i.e. alkyl) or contains 1 or 2 carbon-carbon double bonds (i.e. alkenyl). Fatty acid esters formed from fatty acids containing an odd number of carbon atoms (i.e. even number of carbon atoms in the hydrocarbon chain) are useful in the compositions of the present invention as well as fatty acid esters formed from fatty acids containing an even number of carbon atoms (i.e. odd number of carbon atoms in the hydrocarbon chain). However, fatty acids obtained from natural sources typically contain an even number of carbon atoms, and therefore esters of fatty acids containing an even number of carbon atoms are preferred for reason of commercial availability and cost. Fatty acid compositions obtained from natural sources (e.g., seed oils) typically consist of fatty acids having a range of chain lengths and different degrees of unsaturation. Fatty acid ester compositions derived from such fatty acid mixtures are generally useful in the compositions of the present invention without need to first separate the fatty acid esters.

Fatty acids contain at least 4 carbon atoms and are limited to about 22 carbon atoms from natural sources. Although esters of lower fatty acids (e.g., containing as few a 4 carbon atoms) are useful for the present compositions, esters of fatty acids having at least 8, more preferably at least 10, carbon atoms are preferred because of favorable physical properties (e.g., low volatility). Esters of lower fatty acids can be mixed with esters of higher fatty acids to decrease polarity, water solubility and volatility. As fatty acids obtained from natural sources typically contain 8 to 22 carbon atoms, more typically 10 to 22 carbon atoms, esters of these fatty acids are preferred for reason of commercial availability and cost. The $C_{10}$-$C_{22}$ fatty acid esters with an even number of carbon atoms are, for example, erucic acid, lauric acid, palmitic acid, stearic acid, oleic acid, linoleic acid and linolenic acid. Preferably the one or more fatty esters in the compositions of the present invention comprise at least about 80%, more preferably at least 90%, by weight of esters of fatty acids containing 8 to 22 carbon atoms, preferably 12 to 20 carbon atoms and more preferably 16 to 18 carbon atoms.

Fatty acid compositions obtained from natural sources (e.g., seed oils) typically consist of fatty acids having a range of chain lengths and different degrees of unsaturation. Fatty acid ester compositions derived from such fatty acid mixtures can be useful in the compositions of the present invention without need to first separate the fatty acid esters. Suitable fatty acid ester compositions obtained from plants include seed and fruit oils of sunflower, rapeseed, olive, corn, soybean, cotton and linseed. Of note is a composition of the invention wherein the one or more fatty acid esters comprise fatty acid methyl esters derived from seed oils of sunflower, soybean, cotton or linseed. Of particular note is a composition of the invention wherein the one or more fatty acid esters comprise fatty acid methyl esters derived from soybean oil (also known as methylated soybean oil or methyl soyate).

Fatty acid esters of alkanols and methods for their preparation are well known in the art. For example, "biodiesel" typically comprises fatty acid esters of ethanol or more commonly methanol. Two principal routes used to prepare fatty acid alkanol esters are transesterification starting with another fatty acid ester (often a naturally occurring ester with glycerol) and direct esterification starting with the fatty acid. A variety of methods are known for these routes. For example, direct esterification can be accomplished by contacting a fatty acid with an alkanol in the presence of a strong acid catalyst such as sulfuric acid. Transesterification can be accomplished by contacting a starting fatty acid ester with the alcohol in the presence of a strong acid catalyst such as sulfuric acid but more commonly a strong base such as sodium hydroxide.

Alkylated seed oils are the transesterification products of seed oils with an alkanol. For example methylated soybean oil, also known as methyl soyate, comprises methyl esters produced by the transesterification of soybean oil with methanol. Methyl soyate thus comprises methyl esters of fatty acids in the approximate molar ratio that the fatty acids occur esterified with glycerol in soybean seed oil. Alkylated seed oils such as methyl soyate can be distilled to modify the proportion of methyl fatty acid esters.

Lignosulfonates have been surprisingly discovered to considerably increase the chemical stability of sulfonylurea herbicides in mixtures with fatty acid alkanol esters in the compositions of the present invention. The amount of the one or more lignosulfonates in the compositions of the present invention can range from about 0.1 to about 20% by weight, but for reasons of cost the amount is typically no more than about 10%, preferably no more than about 8%, more preferably no more than about 6% and most preferably no more than about 5% of the composition by weight. Typically the one or more lignosulfonates amount to at least about 0.5% of the composition by weight, although lesser amounts down to about 0.1% can be used. More typically the one or more lignosulfonates amount to at least about 1% of the composition and even more typically at least about 2% of the composition by weight. The amount of lignosulfonates needed to provide a desired degree of stability depends upon the sulfonylurea herbicide and other ingredients in the composition, and can be determined by simple experimentation. Compositions comprising metsulfuron-methyl, rimsulfuron, thifensulfuron-methyl or particularly nicosulfuron often require only a relatively small amount of lignosulfonates (e.g., 1% of the composition by weight) to reduce percent relative decomposition to less than 10% during accelerated aging of 1 week at 40° C., and indeed this small amount of lignosulfonates is often sufficient to reduce the relative percent decomposition of compositions comprising nicosulfuron to less than 3% under these conditions.

Lignin, the basic building block of the lignosulfonates of this invention is formed in woody plants and is a complex natural polymer with regard to structure and homogeneity. Lignosulfonates are sulfonated plant lignins and are commercially well known co-products of the paper industry. The lignosulfonates of the present invention can be prepared by a chemical modification of the basic lignin building block using a sulfite pulping process or a kraft pulping (also known as sulfate pulping) process including subsequent sulfonation. These pulping processes are well known in the paper industry. The sulfite pulping process and the kraft pulping process are described in literature published by Lignotech (e.g., "Specialty Chemicals for Pesticide Formulations", October, 1998) and MeadWestvaco Corp (e.g., "From the Forests to the Fields", June, 1998). Crude lignosulfonate preparations typically contain in addition to sulfonated lignin other plant derived chemicals such as sugars, sugar acids and resins, as well as inorganic chemicals. Although such crude lignosulfonate preparations can be used for the compositions of the present invention, preferably the crude preparations are first refined to provide higher purity of lignosulfonate. Lignosulfonates within the context of the present disclosure and claims also include lignosulfonates that have been extensively chemically modified. Examples of lignosulfonates that have been extensively chemically modified are oxylignins in which the lignin has been oxidized in a process reducing the number of sulfonic acid and methoxyl groups and causing rearrangements increasing the number of phenolic and carboxylic acid groups. An example of an oxylignin is VANISPERSE A marketed by Borregaard LignoTech.

Lignosulfonates vary according to cation, degree of sulfonation and average molecular weight. The lignosulfonates of the present invention can contain sodium, calcium, magnesium, zinc, potassium or ammonium cations or mixtures thereof, but preferably contain sodium. The degree of sulfonation is defined as the number of sulfonate groups per 1000 unit molecular weight of lignosulfonate and in commercially available products typically ranges from about 0.5 to about 4.7. The lignosulfonates in the compositions of the present invention preferably contain a degree of sulfonation ranging from about 0.5 to about 3.0. Lignosulfonates containing a degree of sulfonation from about 0.5 to about 3.0 can be prepared by controlled sulfonation in the kraft pulping process. For example, the degree of sulfonation using the kraft pulping process is 2.9 for REAX 88A, 0.8 for REAX 85A and 1.2 for REAX 907, which are described further below. Average molecular weight of commercially available lignosulfonates typically range from about 2,000 to about 15,100. The lignosulfonates of the present invention preferably have an average molecular weight above about 2,900.

Examples of commercially available refined lignosulfonate products useful in the compositions of the present invention include, but are not limited to, REAX 88A (sodium salt of a chemically modified low molecular weight kraft lignin polymer solubilized by five sulfonate groups, marketed by MeadWestvaco Corp.), REAX 85A (sodium salt of a chemically modified high molecular weight kraft lignin polymer, marketed by MeadWestvaco Corp.), REAX 907 (sodium salt of a chemically modified high molecular weight kraft lignin polymer, marketed by MeadWestvaco Corp.), REAX 100M (sodium salt of a chemically modified low molecular weight kraft lignin polymer marketed by MeadWestvaco Corp.) and Kraftspearse DD-5 (sodium salt of a chemically modified high molecular weight kraft lignin polymer, marketed by MeadWestvaco Corp.).

The compositions of the present invention can contain one or more additional formulating ingredients in a total amount by weight of 0 to about 50%. Additional formulating ingredients can include liquid diluents in addition to the one or more fatty acid esters of $C_1$-$C_4$ alkanols forming the liquid carriers of the present compositions. Typical liquid diluents are described in Marsden, *Solvents Guide,* 2nd Ed., Interscience, New York, 1950. Liquid diluents include, for example, N,N-dimethylformamide, dimethyl sulfoxide, N-alkylpyrrolidone, ethylene glycol, polypropylene glycol, propylene carbonate, dibasic esters, paraffins, alkylbenzenes, alkylnaphthalenes, glycerine, triacetine, oils of olive, castor, linseed, tung, sesame, corn, peanut, cotton-seed, soybean, rape-seed and coconut, ketones such as cyclohexanone, 2-heptanone, isophorone and 4-hydroxy-4-methyl-2-pentanone, acetates such as hexyl acetate, heptyl acetate and octyl acetate, and alcohols such as methanol, cyclohexanol, decanol, benzyl and tetrahydrofurfuryl alcohol. To maintain sulfonylureas in the present compositions undissolved as dispersions of solid particles, substantial amounts of polar solvents are best avoided as liquid carriers. Typically the liquid carrier of the present composition does not include substantial amounts of liquid diluents other than the one or more fatty acid esters of $C_1$-$C_4$ alkanols.

The compositions of the present invention can include as one or more additional formulating ingredients additional surfactants besides lignosulfonates. The properties of these additional surfactants include dispersants and wetting agents. The surfactants can be nonionic or ionic (e.g., anionic) and can include polymeric moieties such as polyoxyethylation. Typical surfactants are described in *McCutcheon's Detergents and Emulsifiers Annual*, Allured Publ. Corp., Ridgewood, N.J., as well as Sisely and Wood, *Encyclopedia of Surface Active Agents*, Chemical Publ. Co., Inc., New York, 1964. Examples of surfactants include polyethoxylated alcohols, polyethoxylated alkylphenols, polyethoxylated sorbitan fatty acid esters, polyethoxylated sorbitol fatty acid esters, dialkyl sulfosuccinates, alkyl sulfates, alkylbenzene sulfonates, organosilicones, N,N-dialkyltaurates, lignin sulfonates, naphthalene sulfonate formaldehyde condensates, polycarboxylates, glycerol esters, polyoxyethylene/polyoxypropylene block copolymers, and alkylpolyglycosides where the number of glucose units, referred to as degree of polymerization (D.P.), can range from 1 to 3 and the alkyl units can range from $C_6$ to $C_{14}$ (see *Pure and Applied Chemistry* 72, 1255-1264).

Typically the compositions of the present invention include one or more surfactants to enable forming an emulsion when the compositions are added to water in a spray tank. These surfactants can be cationic, anionic or nonionic, but are more typically anionic or nonionic. Examples of particularly suitable anionic surfactants for this purpose are sulfonates such as calcium dodecyl benzenesulfonate. Examples of particularly suitable nonionic surfactants are polyoxyethylated (POE) sorbitan esters such as POE (20) sorbitan trioleate and polyoxyethylated (POE) sorbitol esters such as POE (40) sorbitol hexaoleate. POE (20) sorbitan trioleate is commercially available under the tradename TWEEN 85 marketed by Uniqema. POE (40) sorbitol hexaoleate is commercially available under the tradenames ATLAS G1086 and CIRRASOL G1086 marketed by Uniqema. Combination of a POE sorbitan ester with a POE sorbitol ester allows optimizing the HLB (hydrophilic-lipophilic balance) value of the surfactant to obtain the highest quality emulsion (smallest suspended droplets) when the composition is added to water. High quality of emulsions typically leads to optimal herbicidal performance. Therefore of particular note for optimal herbicidal performance is a composition of the present invention comprising one or more nonionic surfactants selected from polyoxyethylated (POE) sorbitan esters such as POE (20) sorbitan trioleate and polyoxyethylated (POE) sorbitol esters such as POE (40) sorbitol hexaoleate and mixtures thereof.

The present compositions can also contain one or more solid diluents in suspension in the liquid carrier. The solid diluents can be water-soluble or water-insoluble. Typical solid diluents are described in Watkins et al., *Handbook of Insecticide Dust Diluents and Carriers,* 2nd Ed., Dorland Books, Caldwell, N.J. Examples of water-soluble solid diluents include salts such as alkali metal phosphates (e.g., sodium dihydrogen phosphate), alkaline earth phosphates, sulfates of sodium, potassium, magnesium and zinc, sodium and potassium chloride, and sodium benzoate, and sugars and sugar derivatives such as sorbitol, lactose and sucrose. Examples of water-insoluble solid diluents include, but are not limited to, clays, synthetic and diatomaceous silicas, calcium and magnesium silicates, titanium dioxide, aluminum, calcium and zinc oxide, calcium and magnesium carbonate, calcium and barium sulfate, and charcoal.

Certain solid diluents such as clays have been discovered to provide significant resistance to separation of suspended or dispersed solid particles in the present composition, which otherwise would result in formation of a bleed layer (i.e. layer not containing suspended or dispersed solid particles). Furthermore it has been discovered that these solid diluents can impart a reversible gel structure to the composition. A reversible gel provides high viscosity to the composition at low shear (e.g., when the composition is stored in a container), but low viscosity facilitating pouring results when high shear is applied (e.g., when a container of the composition is shaken). A benefit of reversible gel structure is that formation of a bleed layer and sedimentation of particles to the bottom of the container are significantly reduced. Typically, a composition of this invention containing at least about 0.1% clay by weight will form a reversible gel. More than 10% clay can be useful, but for reason of cost, no more than about 10% is preferred. More preferred is a range of from 0.1 to 5%, and most preferred is a range of from 0.5 to 3%. Examples of clays useful in the present composition include magnesium aluminum silicates such as attapulgite (e.g., ATTAGEL 50 from BASF Corp.) and other aluminum silicates such as montmorillonite (e.g., BARDEN clay from the Kentucky-Tennessee Clay Co. and BENTONE clay from Elementis Specialties). Typical solid clays useful as diluents are described in Watkins et al., Handbook of Insecticide Dust Diluents and Carriers, 2nd Ed., Dorland Books, Caldwell, N.J.

Other formulation ingredients can be used in the present invention such as rheology modifiers, wetting agents, dyes, defoamers, drying agents, and the like. These ingredients are known to one skilled in the art and can be found described, for example, in *McCutcheon's* 2001, *Volume 2: Functional Materials* published by MC Publishing Company.

The methods for making the suspensions and dispersions of sulfonylurea particles useful for the compositions of the present invention are well known and include ball-milling, bead-milling, sand-milling, colloid milling and air-milling combined with high-speed blending. The Examples of the present disclosure use a bead-milling process.

Without further elaboration, it is believed that one skilled in the art using the preceding description can utilize the present invention to its fullest extent. The following Examples are, therefore, to be construed as merely illustrative, and not limiting of the disclosure in any way whatsoever.

Examples 1-17 describe the preparation and stability testing of compositions of the present invention. Comparative Example 1 describes the preparation and stability testing of a corresponding composition lacking lignosulfonate. The stability of the sulfonylureas in these compositions was determined by aging samples in heated ovens and then comparing the sulfonylurea content before and after aging to determine percent (%) relative decomposition. The % relative decomposition was calculated by subtracting the final weight % sulfonylurea from the initial weight % sulfonylurea, then dividing the resulting difference by the initial weight % sulfonylurea, and then multiplying the resulting quotient by 100%. Sulfonylurea content was determined by assaying the compositions with high-pressure liquid chromatography (HPLC) using reverse phase columns and eluants.

Example 1

To a 250-mL glass beaker equipped with a overhead stirrer was added a $C_{16}$-$C_{18}$ fatty acid methyl ester (Cognis Corp. AGNIQUE ME 18SDU, 43.9 g), a lignosulfonate (MeadWestvaco Corp. REAX 88A, 3.0 g), a POE (20) sorbitan trioleate nonionic surfactant (Uniqema TWEEN 85, 12.0 g), a POE (40) sorbitol hexaoleate nonionic surfactant (Uniqema ATLAS G1086, 6.0 g), atrazine (34.0 g), nicosulfuron (0.55 g) and rimsulfuron (0.55 g). The stirred mixture was homogenized using a 0.6-L Dyno-mill (Model KDL, a horizontal bead mill manufactured by W. A Bachofen of Basel, Switzerland), and the resultant suspension concentrate was bottled. A sample was aged in an oven heated to 40° C. for 1 week, and then the content of sulfonylurea herbicides was assayed by HPLC. Chemical stability results are listed in Table 1 and Table 2.

Example 2

To a 250-mL glass beaker equipped with a overhead stirrer was added a $C_{16}$-$C_{18}$ fatty acid methyl ester (AGNIQUE ME 18SDU, 43.9 g), a lignosulfonate (REAX 88A, 3.0 g), a POE (20) sorbitan trioleate nonionic surfactant (TWEEN 85, 9.0 g), a proprietary surfactant blend of calcium dodecylbenzenesulfonate and caster oil ethoxylate (Stepan Corp. TOXIMUL 3463F, 9.0 g), atrazine (34.0 g), nicosulfuron (0.55 g) and rimsulfuron (0.55 g). The stirred mixture was homogenized using a 0.6-L Dyno-mill, and the resultant suspension concentrate was bottled. A 10-g sample was aged in an oven heated to 40° C. for 1 week and then the content of sulfonylurea herbicides was assayed by HPLC. Chemical stability results are listed in Table 1 and Table 2.

Example 3

To a 1-L stainless steel beaker equipped with a overhead stirrer was added a $C_{16}$-$C_{18}$ fatty acid methyl ester (AGNIQUE ME 18SDU, 432.6 g), a lignosulfonate (REAX 907, 45.0 g), a POE (20) sorbitan trioleate nonionic surfactant (TWEEN 85, 45.0 g), a POE (40) sorbitol hexaoleate nonionic surfactant (ATLAS G1086, 45.0 g) and nicosulfuron (92.5%, 32.4 g). The stirred mixture was homogenized using a 0.6-L Dyno-mill, and the resultant suspension concentrate was bottled. Three 10-g samples were aged in heated ovens. One sample was heated in an oven at 40° C. for 1 week and then assayed by HPLC for nicosulfuron content. The second sample was heated in an oven at 40° C. for 2 weeks and then assayed by HPLC for nicosulfuron content. The third sample was heated in an oven at 54° C. for 2 weeks and then assayed by HPLC for nicosulfuron content. Chemical stability results are listed in Table 1.

Comparative Example 1

To a 250-mL glass beaker equipped with a overhead stirrer was added a $C_{16}$-$C_{18}$ fatty acid methyl ester (AGNIQUE ME 18SDU, 49.9 g), a POE (20) sorbitan trioleate nonionic surfactant (TWEEN 85, 7.5 g), a POE (40) sorbitol hexaoleate nonionic surfactant (ATLAS G1086, 7.5 g), atrazine (34.0 g), nicosulfuron (0.55 g) and rimsulfuron (0.55 g). The stirred mixture was homogenized using a 0.6-L Dyno-mill, and the resultant suspension concentrate was bottled. A sample was aged in an oven heated to 35° C. for 1 week and then the content of sulfonylurea herbicides was assayed by HPLC. Chemical stability results are listed in Table 1 and Table 2.

TABLE 1

Chemical Stability of Nicosulfuron during Aging of Liquid Formulations

| Sample | Weight % Nicosulfuron | Aging Conditions | % Relative Decomposition |
|---|---|---|---|
| Example 1 | 0.55 | 1 week at 40° C. | 0 |
| Example 2 | 0.55 | 1 week at 40° C. | 2.0 |
| Example 3 | 5.0 | 1 week at 40° C. | 1.2 |
| | | 2 weeks at 40° C. | 1.8 |
| | | 2 weeks at 54° C. | 11.2 |
| Comparative Example 1 | 0.55 | 1 week at 35° C. | 18.2 |

TABLE 2

Chemical Stability of Rimsulfuron during Aging of Liquid Formulations

| Sample | Weight % Rimsulfuron | Aging Conditions | % Relative Decomposition |
|---|---|---|---|
| Example 1 | 0.55 | 1 week at 40° C. | 4.4 |
| Example 2 | 0.55 | 1 week at 40° C. | 11.6 |
| Comparative Example 1 | 0.55 | 1 week at 35° C. | 27.3 |

Examples 4-10

Composition Examples 4-10 further exemplify the present invention. Formulation ingredients were combined in the amounts shown in Table 3A according to the following general procedure. To a 250-mL glass beaker stirred with an overhead stirrer was added a $C_{16}$-$C_{18}$ fatty acid methyl ester (AGNIQUE ME 18SDU), a lignosulfonate (REAX 907), a POE (20) sorbitan trioleate nonionic surfactant (TWEEN 85), a POE (40) sorbitol hexaoleate nonionic surfactant (Uniqema CIRRASOL G1086), optionally other ingredients such as EO PO Block Copolymer (SURFONIC L68-28X, PLURONIC P103, or PLURONIC L35) and the solid diluents attapulgite clay (Engelhard ATTAGEL 50) or colloidal silicon dioxide (Degussa AEROSIL 200), and nicosulfuron active ingredient (technical material containing 93.2% nicosulfuron). The mixture was then homogenized using a 0.2-L Eiger-mill, and the resulting suspension concentrate, a composition of the present invention, was bottled.

TABLE 3A

Ingredient Amounts Used in Nicosulfuron Compositions of Examples 4 to 10*

| Ingredient | Example 4 | 5 | 6 | 7 | 8 | 9 | 10 |
|---|---|---|---|---|---|---|---|
| Nicosulfuron (93.2%) | 4.3 | 4.3 | 4.3 | 4.3 | 4.3 | 4.3 | 4.3 |
| AGNIQUE ME 18SDU | 64.7 | 64.7 | 64.7 | 64.7 | 57.7 | 62.7 | 62.7 |
| REAX 907 | 1.0 | 1.0 | 1.0 | 1.0 | 1.0 | 1.0 | 1.0 |
| TWEEN 85 | 15.0 | 7.5 | 7.5 | 7.5 | 15.0 | 15.0 | 15.0 |
| CIRRASOL G1086 | 15.0 | 7.5 | 7.5 | 7.5 | 15.0 | 15.0 | 15.0 |
| SURFONIC L68-28X | 0 | 15.0 | 0 | 0 | 0 | 0 | 0 |
| PLURONIC P103 | 0 | 0 | 15.0 | 0 | 0 | 0 | 0 |
| PLURONIC L35 | 0 | 0 | 0 | 15.0 | 5.0 | 0 | 0 |
| ATTAGEL 50 | 0 | 0 | 0 | 0 | 2.0 | 2.0 | 0 |
| AEROSIL 200 | 0 | 0 | 0 | 0 | 0 | 0 | 2.0 |

*Amounts are listed in units of grams.

A 10-g sample of each of the example compositions was aged in an oven at 40° C. for 8 weeks. For some of the example compositions another 10-g sample was aged in an oven at 40° C. for 2 weeks. The aged samples were assayed by HPLC for nicosulfuron content. Chemical stability results are listed in Table 3B. A dash "-" means no test result.

TABLE 3B

Chemical Stability of Nicosulfuron (% Relative Decomposition) during Aging of Compositions of Examples 4 to 10 at 40° C.

| Time period | Example 4 | 5 | 6 | 7 | 8 | 9 | 10 |
|---|---|---|---|---|---|---|---|
| 2 weeks | — | — | — | 0.5 | 0.8 | 2.2 | — |
| 8 weeks | 2.2 | 3.2 | 1.0 | 1.5 | 2.5 | 2.0 | 1.5 |

As can be seen from Table 3B, all the example compositions comprising nicosulfuron demonstrated excellent stability in this test.

Examples 11-17

Composition Examples 11-17 exemplify the present invention with a variety of sulfonylurea active ingredients. Formulation ingredients were combined in the amounts shown in Table 4A according to the following general procedure. To a 250-mL glass beaker stirred with an overhead stirrer was added a $C_{16}$-$C_{18}$ fatty acid methyl ester (AGNIQUE ME 18SDU), a lignosulfonate (REAX 907), a POE (20) sorbitan trioleate nonionic surfactant (TWEEN 85 or the low-moisture TWEEN 85 LM), a POE (40) sorbitol hexaoleate nonionic surfactant (CIRRASOL G1086), a solid diluents (ATTAGEL 50), and a sulfonylurea active ingredient selected from nicosulfuron, thifensulfuron-methyl, tribenuron-methyl, chlorsulfuron, chlorimuron-ethyl, rimsulfuron, and metsulfuron-methyl. The mixture was then homogenized using a 0.2-L Eiger-mill, and the resulting suspension concentrate, a composition of the present invention, was bottled.

TABLE 4A

Ingredient Amounts Used in Compositions of Examples 11 to 17*

| Ingredient | Example 11 | 12 | 13 | 14 | 15 | 16 | 17 |
|---|---|---|---|---|---|---|---|
| Nicosulfuron | 4.3 | 0 | 0 | 0 | 0 | 0 | 0 |
| Thifensulfuron-methyl | 0 | 4.3 | 0 | 0 | 0 | 0 | 0 |
| Tribenuron-methyl | 0 | 0 | 4.3 | 0 | 0 | 0 | 0 |
| Chlorsulfuron | 0 | 0 | 0 | 4.3 | 0 | 0 | 0 |
| Chlorimuron-ethyl | 0 | 0 | 0 | 0 | 4.3 | 0 | 0 |
| Rimsulfuron | 0 | 0 | 0 | 0 | 0 | 4.3 | 0 |
| Metsulfuron-methyl | 0 | 0 | 0 | 0 | 0 | 0 | 4.3 |
| AGNIQUE ME 18SDU | 62.7 | 62.7 | 62.7 | 62.7 | 62.7 | 62.7 | 62.7 |
| REAX 907 | 1.0 | 1.0 | 1.0 | 1.0 | 1.0 | 1.0 | 1.0 |
| TWEEN 85 | 0 | 15.0 | 15.0 | 15.0 | 15.0 | 15.0 | 15.0 |
| TWEEN 85 LM | 15.0 | 0 | 0 | 0 | 0 | 0 | 0 |
| CIRRASOL G1086 | 15.0 | 15.0 | 15.0 | 15.0 | 15.0 | 15.0 | 15.0 |

*Amounts are listed in units of grams.

A 10-g sample of each of the example compositions was aged in an oven at 40° C. for 1 week. The aged samples were assayed by HPLC for content of sulfonylurea active ingredient. Chemical stability results are listed in Table 4B.

TABLE 4B

Chemical Stability of Sulfonylurea Active Ingredient (% Relative Decomposition) during Aging of Compositions of Examples 11 to 17 at 40° C.

| Time period | Example 11 | 12 | 13 | 14 | 15 | 16 | 17 |
|---|---|---|---|---|---|---|---|
| 1 week | 2.78 | 4.77 | 66.48 | 28.22 | 23.91 | 9.07 | 6.23 |

The results in Table 4B show that for the particular compositions of Examples 11-17, the observed stability varied with sulfonylurea. Compositions comprising metsulfuron-methyl, nicosulfuron, rimsulfuron or thifensulfuron-methyl underwent less than 10% decomposition, and the composition comprising nicosulfuron was the most stable. The compositions of Examples 11-17 all contained only 1% lignosulfonate, and the results indicate larger amounts of lignosulfonate are desirable for compositions containing sulfonylureas having greater susceptibility to decomposition.

What is claimed is:

1. A single liquid-phase herbicide composition comprising by weight relative to the total weight of the composition:

(a) from 0.1 to 20% of nicosulfuron, metsulfuron-methyl, thifensulfuron-methyl, or rimsulfuron, or mixtures thereof;

(b) from about 1 to about 8% of one or more lignosulfonates;

(c) from 40 to 99.8% of methyl esters of one or more fatty acids; and (d) from 6 to 50% of nonionic surfactant polyoxyethylated sorbitol esters, wherein the single liquid-phase herbicide composition does not contain an ethoxylated fatty amine surfactant; and the single liquid-phase herbicide composition excludes emulsions.

2. The composition of claim 1 further comprising one or more nonsulfonylurea herbicides and/or herbicide safeners.

3. The composition of claim 2 further comprising atrazine.

4. The composition of claim 1 wherein the one or more lignosulfonates of component (b) is one or more ammonium, alkali metal or alkaline earth metal lignosulfonate salts.

5. The composition of claim 4 wherein the one or more lignosulfonates of component (b) is sodium lignosulfonate.

6. The composition of claim 1 wherein the composition further comprises a clay.

7. The composition of claim 1 wherein component (b) is from 3 to about 8% of the composition by weight relative to the total weight of the composition.

8. The composition of claim 1 wherein the composition contains no more than 1% water by weight relative to the total weight of the composition.

9. A single liquid-phase herbicide composition comprising by weight relative to the total weight of the composition (a) from 0.1 to 20% of nicosulfuron, or salts thereof;

(b) from 3 to about 8% of one or more lignosulfonates; and (c) from 40 to 99.8% of methyl esters of one or more fatty acids; and (d) from 6 to 50% of nonionic surfactant polyoxyethylated sorbitol esters;

wherein the single liquid-phase herbicide composition does not contain an ethoxylated fatty amine surfactant; and the single liquid-phase herbicide composition excludes emulsions.

10. The composition of claim 9 wherein the composition further comprises a clay.

11. The composition of claim 9 wherein the one or more lignosulfonates of component (b) is one or more ammonium, alkali metal or alkaline earth metal lignosulfonate salts.

12. The composition of claim 11 wherein the one or more lignosulfonates of component (b) is sodium lignosulfonate.

* * * * *